United States Patent Office 3,435,059
Patented Mar. 25, 1969

3,435,059
ALUMINUM MONOHYDRIDE CATECHOLATE
Donald L. Schmidt, Midland, and Arthur L. Daniels, Coleman, Mich., assignors to The Dow Chemical Company, Midland, Mich., a corporation of Delaware
No Drawing. Filed May 31, 1966, Ser. No. 553,689
Int. Cl. C07f 5/06
U.S. Cl. 260—448         1 Claim

ABSTRACT OF THE DISCLOSURE

The novel compound aluminum monohydride catecholate is disclosed which is utilized as a reducing agent particularly in organic chemical reactions and as a reactant and aluminum source material for depositing aluminum coatings on various substrates.

---

This invention relates to a novel organoaluminum compound and more particularly is concerned with the novel organoaluminum compound, aluminum monohydride catecholate corresponding to the formula

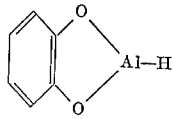

This novel compound is a white solid having an elemental analysis and an infrared spectrum consistent with the assigned structure.

Aluminum monohydride catecholate finds use as a reducing agent particularly in organic chemical reactions. It also can be used as a reactant and aluminum source material for depositing aluminum coatings on various substrates.

The novel compound of the present invention readily is prepared by reacting aluminum hydride with catechol in an inert solvent.

The preparation of the present novel compound ordinarily is carried out in an inert, substantially anhydrous atmosphere, e.g. nitrogen or argon, in the presence of an ether solvent for the reactants. Particularly suitable solvents are diethyl ether, n-dipropyl ether, diisopropyl ether, tetrahydrofuran and the like. Ordinarily the reaction is carried out at from about minus 78 to about positive 30° C. The lower temperatures are preferred as these provide for ready control of the reaction.

The actual preparation of the present novel compound ordinarily is carried out by agitating an ethereal solution of the reactants. Conveniently, an ethereal solution of catechol is added to a stirred ethereal aluminum hydride solution over a period of time. During the mixing of the reactants, white particles of the product compound form directly in the reaction medium. Usually, to assure completion of the reaction, the reaction mixture is stirred or agitated for an additional period of time, e.g. from several minutes to several hours or more, following the completion of mixing of the reactants. Agitating or permitting the resulting product mixture to stand for extended periods of time after the reaction period has not been found to be detrimental. The solid product readily is recovered from the mixture by filtering, centrifuging or other solid-liquid separatory techniques.

Quantities of reactants ordinarily employed are about stoichiometric for preparation of aluminum monohydride catecholate; although an excess of either of the reactants can be used if desired.

The solution concentrations to be used are not critical. Maximum concentrations ordinarily are those such that the reactants are completely dissolved therein at the operating conditions. Extremely dilut solutions are somewhat undesirable in that they are unwieldly to handle, require large storage and processing equipment. For most operations, reactant solutions ranging in concentration from about 0.01 to about 1 molar with respect to the reactant solutes are used.

For optimum product yield and purity, all processing operations, including the initial solution preparation, are carried out in a substantially anhydrous, inert atmosphere, e.g. nitrogen or argon. Also, all reactants and solvents preferably are dried so as to be substantially anhydrous prior to use in the process.

The following example will serve to further illustrate the present invention but is not meant to limit it thereto.

Example.—Under a nitrogen atmosphere in a substantially anhydrous dry box, to about 500 milliliters of a cold solution (~ minus 78° C.) of 0.20 molar aluminum hydride in diethyl ether slowly was added about 500 milliliters of a solution of 0.20 molar catechol in diethyl ether. As the reactants were mixed at about room temperature, white solid particles formed directly in the reaction mass. Following completion of addition of the aluminum hydride solution to the catechol solution, the reaction mixture was stirred for an additional period of about 30 minutes. The solid particulate product was removed from the reaction mass by filtering.

Elemental chemical analysis of this product gave Al—19.86 percent; C—52.92 percent; H—4.34 percent; O—22.88 percent (by difference). Calculated theoretical analysis for aluminum monohydride catecholate

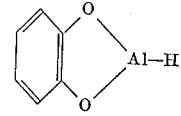

is Al—19.83 percent; C—52.91 percent; H—3.70 percent; O—23.56 percent.

This product was substantially insoluble in benzene and aliphatic ethers but is soluble in tetrahydrofuran.

The infrared spectrum of the solid product showed one sharp Al—H band at about 1900 cm.$^{-1}$ and was consistent for the assigned structure.

We claim:
1. Aluminum monohydride catecholate.

References Cited

UNITED STATES PATENTS

| | | |
|---|---|---|
| 2,831,898 | 4/1958 | Ecke et al. |
| 2,862,956 | 12/1958 | Gundell et al. _____ 260—470 |
| 3,060,216 | 10/1962 | Harecht et al. |
| 3,147,272 | 9/1964 | Brown et al. |
| 3,200,157 | 8/1965 | Buls et al. |
| 3,281,443 | 10/1966 | Hunt |

FOREIGN PATENTS 1,246,620  10/1960  France.

TOBIAS E. LEVOW, Primary Examiner.
H. M. S. SNEED, Assistant Examiner.

U.S. Cl. X.R.
117—107.2